United States Patent
Simmons

(10) Patent No.: US 6,843,829 B2
(45) Date of Patent: Jan. 18, 2005

(54) BLOCK POLYURETHANE-ETHER AND POLYUREA-ETHER GAS SEPARATION MEMBRANES

(75) Inventor: John W. Simmons, Wilmington, DE (US)

(73) Assignee: L'Air Liquide-Societe Anonyme a'Directoire et Conseil de Surveillance pour l'Etude et l'Exploitation des Procedures Georges Claude, Paris (FR)

( * ) Notice: Subject to any disclaimer, the term of this patent is extended or adjusted under 35 U.S.C. 154(b) by 0 days.

(21) Appl. No.: 10/389,024

(22) Filed: Mar. 13, 2003

(65) Prior Publication Data

US 2003/0226446 A1 Dec. 11, 2003

Related U.S. Application Data

(60) Provisional application No. 60/367,885, filed on Mar. 27, 2002.

(51) Int. Cl.$^7$ .......................... B01D 53/22; B01D 71/52; B01D 71/54
(52) U.S. Cl. ....................... 95/49; 95/51; 95/52; 96/13; 96/14
(58) Field of Search .............. 95/45, 49, 51, 95/52; 96/4, 12–14

(56) References Cited

U.S. PATENT DOCUMENTS

| | | | |
|---|---|---|---|
| 3,653,180 A | * | 4/1972 | Juliano et al. .................. 95/47 |
| 4,608,060 A | * | 8/1986 | Kulprathipanja et al. ...... 95/47 |
| 4,747,953 A | | 5/1988 | Zupancic et al. |
| 4,880,883 A | | 11/1989 | Grasel et al. |
| 4,963,165 A | | 10/1990 | Blume et al. |
| 5,030,252 A | * | 7/1991 | Sanders et al. ................. 95/47 |
| 5,085,676 A | * | 2/1992 | Ekiner et al. ................... 96/13 |
| 5,130,205 A | * | 7/1992 | Vu et al. .................. 428/475.5 |
| 5,209,848 A | * | 5/1993 | Jeanes et al. ............... 210/490 |
| 5,352,273 A | * | 10/1994 | Simmons et al. .............. 95/45 |
| 5,611,843 A | | 3/1997 | Ho |
| 5,868,992 A | * | 2/1999 | Roman ........................ 264/340 |
| 6,387,994 B1 | * | 5/2002 | Gore et al. ................. 524/198 |
| 6,620,472 B1 | * | 9/2003 | Shepard et al. ............ 428/35.4 |
| 6,656,252 B2 | * | 12/2003 | Kita et al. ........................ 96/4 |
| 2002/0152889 A1 | * | 10/2002 | Baker et al. .................... 95/45 |

FOREIGN PATENT DOCUMENTS

| | | |
|---|---|---|
| EP | 0159783 A2 * | 10/1986 |
| WO | WO 01 32763 A | 5/2001 |

OTHER PUBLICATIONS

Okamoto, et al, (Macromolecules,1995, 28, 6950).
Bondar et al. (Journal of Poly Sci.: Part B, 1999, 37, 2463).
International Search Report PCT/IB/ 03/01115.

* cited by examiner

*Primary Examiner*—Robert H. Spitzer
(74) *Attorney, Agent, or Firm*—Linda K. Russell

(57) ABSTRACT

Gas separation membranes formed from polyether-urethane or polyether-urea block copolymers are useful for separating gases from gas mixtures. The membranes and processes are especially suited for separating polar gases from mixtures that contain polar and non-polar species. The novel membranes exhibit good permeability and permselectivity, as well as durability, making them well suited for industrial applications such as removal of acid gases from natural gas and removal of carbon dioxide from synthesis gas.

52 Claims, No Drawings

BLOCK POLYURETHANE-ETHER AND POLYUREA-ETHER GAS SEPARATION MEMBRANES

RELATED APPLICATIONS

This application claims priority from U.S. Provisional Application No. 60/367,885 filed Mar. 27, 2002.

FIELD OF THE INVENTION

This invention relates to membranes and processes for separating or concentrating gas mixtures, especially mixtures containing at least one polar gas such as carbon dioxide, hydrogen sulfide, sulfur dioxide, or water from at least one non-polar gas such as helium, hydrogen, nitrogen, or hydrocarbons using a selectively permeable membrane. More specifically, it relates to novel polyurethane-polyether and polyurea-polyether block copolymer gas separation membranes for separating gas mixtures.

The polyurethane-polyether and polyurea-polyether block copolymers contain alternating polyether (PE) soft segments and either polyurethane or polyurea hard segments. These block copolymers exhibit excellent gas separation properties especially for the separation of gas mixtures containing carbon dioxide and hydrogen, carbon dioxide and methane, or carbon dioxide and nitrogen. The inventive membranes exhibit exceptionally good permeation rates with high selectivity.

BACKGROUND OF THE INVENTION

Permselective membranes for gas separation are known and used commercially in applications such as the production of oxygen-enriched air, production of nitrogen-enriched-air for inerting and blanketing, the upgrading of natural gas streams to pipeline quality specifications (e.g., removal of carbon dioxide, hydrogen sulfide, and nitrogen from raw natural gas), and the recovery of hydrogen from various petrochemical and oil refining streams (e.g., separation of hydrogen from methane, ethane, ethylene, or carbon monoxide). Preferred membranes for industrial gas separations exhibit a combination of high flux and high permselectivity.

The permeability of a gas A, $P_A$ through a membrane is often expressed as $$P_A = D_A \times S_A$$

where $D_A$ is the effective diffusivity of the gas through the membrane material, and $S_A$ is the solubility coefficient of the gas in the material. The ideal selectivity of a membrane for component A relative to component B, $\alpha_{A/B}$, is the ratio of permeabilities of the two components:

$$\alpha_{A/B} = \frac{[P_A]}{[P_B]} = \frac{[D_A]}{[D_B]} \times \frac{[S_A]}{[S_B]}$$

where, $D_A/D_B$ is the diffusivity selectivity, which is the ratio of diffusion coefficients of components A and B. The ratio of solubility coefficients of components A and B, $S_A/S_B$, is the solubility selectivity. Solubility selectivity is controlled by the relative affinity of the gas molecules to the polymer of the membrane; whereas, diffusivity selectivity is governed primarily by the relative sizes of the gas molecules and the sieving ability of the polymer matrix.

Current membranes used for industrial gas separation and/or concentration is primarily based on stiff-chain, rigid, glassy materials. The diffusivity component of the gas tends to be the controlling factor, and the ability of gas molecules to permeate is very size dependent. In such membrane materials, smaller gas molecules such as helium and hydrogen are more permeable than larger molecules such as oxygen, nitrogen, and methane. For rubbery or elastomeric polymers, the polymer chains are more flexible and less discriminating by molecular size. Solubility effects generally dominate selectivity in these cases. Permeability for rubbery polymers is generally much greater than for glassy, more rigid polymers. Generally, an inverse relationship between gas permeation rate and selectivity has been observed with most polymeric membranes. This relationship is generally observed for all glassy high glass-transition temperature polymers and for rubbery polymers. Consequently, prior-art gas separation membranes tend to exhibit either high gas permeation rates at the sacrifice of high permselectivity or the inverse. It would be highly desirable for gas separation membranes to exhibit both high gas permeation rates and high permselectivity. Further, it is desirable for such materials to be easily fabricated into appropriate membrane structures. An application where membranes have been used commercially is for the removal of carbon dioxide and acid gases from raw natural gas to achieve pipeline quality natural gas (essentially less than 2.5% carbon dioxide). The major component of raw natural gas is methane, with lesser amounts of carbon dioxide, hydrogen sulfide, sulfur oxides, higher hydrocarbons, water, and nitrogen. The nature and purity of the raw gas is dependent on geographic location, geological formation, production history of the well, and the like. The majority of substandard raw gas is purified using chemical sorption systems, but these are costly to build, operate, and maintain. Membrane systems have had limited success in natural gas processing because of high plant investment (a reflection of low membrane permeability), high operating cost (a reflection of low carbon dioxide/methane selectivity), and poor membrane durability (a reflection of polar gas components in the raw gas). Another potential separation is the removal of carbon dioxide from synthesis gas streams, which typically contain hydrogen, carbon dioxide, carbon monoxide, methane and water. Currently, carbon dioxide is removed from synthesis gas by amine absorption, which is a costly and maintenance-intensive process. Existing membranes are permselective to hydrogen, and thus the hydrogen product is obtained at low pressure. It would be highly desirable to maintain the hydrogen at high pressure, which would require a membrane that is permselective to carbon dioxide. The development of a membrane with high carbon dioxide permeability and high carbon dioxide/hydrogen selectivity could significantly reduce the cost of synthesis gas production.

There is relatively little prior art regarding permselective polymeric membranes for separating polar gases from non-polar gases. U.S. Pat. No 5,611,843 discloses a composition suitable for separating gas streams containing carbon dioxide, especially hydrogen rich gas streams containing carbon dioxide and carbon monoxide. The composition comprises a hydrophilic polymer and at least one salt of an amino acid, the salt of the amino acid being present in an amount ranging from about 10 to about 80 wt % based on the total weight of the composition. The polymers disclosed have to be hydrophilic polymers such as polyvinyl alcohol, polyvinyl acetate, and polyethylene oxide.

Okamoto et al. (Macromolecules, 1995, 28, 6950) reports permeation properties of poly(ether imide) segmented block copolymers for polar/nonpolar gas separations. These polymers consist of hard, glassy polyimide domains and soft, rubbery polyether domains. The polymers have excellent combinations of carbon dioxide permeability and high carbon dioxide/nitrogen separation factors. No data is reported for carbon dioxide/hydrogen separations. Bondar et. al. (Journal of Poly Sci.: Part B, 1999, 37, 2463) shows the gas sorption properties for a family of polyamide-polyether phase separated block copolymers. The gas sorption properties suggest strong favorable interactions between carbon dioxide and the polar linkages in the material, which results in very high carbon dioxide/non-polar gas solubility selectivity in these polymers. Only polyamide-polyether block copolymers are reported, specifically commercially available Pebax®. U.S. Pat. No. 4,963,165 discloses a composite membrane made from a polyamide-polyether block copolymer useful in separating polar gases from non-polar gases. The polymers consist of a saturated aliphatic polyamide hard segment and a polyether soft segment. Only polyamide-polyether block copolymers are reported, specifically commercially available Pebax®.

The membranes of this invention are rubbery in nature and as such exhibit high permeability coefficients, but have low ability to separate gases based on molecular size. However, they exhibit extremely high solubility coefficients for polar gases (e.g., carbon dioxide, hydrogen sulfide, sulfur dioxide, water) and low solubility coefficients for non-polar gases (e.g., helium, hydrogen, nitrogen, methane), and as such offer high solubility selectivity. Thus, the membranes of this invention offer both high permeability and high permselectivity for polar gases. Thus, they are well suited for separation of polar gases from commercial gas mixtures. They are especially suited, without limitation, for removal of polar components from natural gas, and separation of carbon dioxide from synthesis gas.

DETAILED DESCRIPTION OF THE INVENTION

This invention is directed to novel membranes made from polyurethane-polyether and polyurea-polyether block copolymers. The invention is also directed at processes for separating one or more polar gases from a gaseous mixture using such membranes. The polyurethane-polyether and polyurea-polyether block copolymers are produced by reacting at least one polyether glycol with either an aromatic or aliphatic diisocyanate followed by reaction with at least one aliphatic diol (to form a polyurethane-polyether) or with at least one aliphatic diamine (to form a polyurea-polyether). The resulting polymers contain polyether soft segments and polyurethane or polyurea hard segments.

Embodiments of this invention are directed to membranes made from certain polyurethane-polyether and polyurea-polyether block copolymers that exhibit a unique combination of both high permeability and high permselectivity for the separation of various gas mixtures. Another aspect of this invention is directed to the separation of gases using said block copolymers. The block copolymers are produced by reacting at least one polyether glycol with either an aromatic or aliphatic diisocyanate followed by reaction with at least one aliphatic diol (to form a polyurethane-polyether) or with a at least one aliphatic diamine (to form a polyurea-polyether) in the presence of a catalyst, such as organotin compounds, such as dibutyltindilaurate, but other catalysts known to one skilled in the art may be used. During polymerization the temperature is preferably about 150°–260° C. The resulting polymers contain segments (noted as "I") that are soft (noted as "s") comprising polyether soft segments (noted as "$I_s$") and hard (noted as "h") comprising polyurethane or polyurea hard segments (noted as "$I_h$"). Depending on the chemical components, glycol excess, catalyst, and temperature, the polymerization is complete within about 4–8 hours. Preferably this process is carried out at ambient pressure, but it may also be conducted at other pressures known to one skilled in the art for polymerization.

The synthesized or resultant block copolymers are represented by the repeating units of formulas ($I_s$) and ($I_h$):

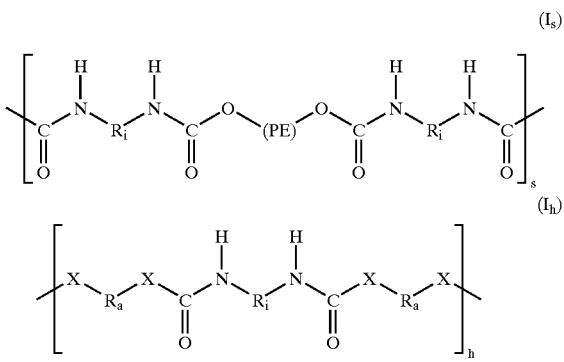

in which $R_i$ of formulas ($I_s$) and ($I_h$) is an aliphatic or aromatic radical of at least about 2–18 carbon atoms; (PE) of formula ($I_s$) is a polyether segment having a number average molecular weight, $M_n$ (which is essentially equivalent to $M_n$ of the repeating formula ($I_s$)), ranging from about 600 to 8000, and preferably about 1000 to 4000; and $R_a$ of formula ($I_h$) is a linear or branched aliphatic radical of at least about 2–18 carbon atoms; and, X is an oxygen atom or —NH—. If X is oxygen, the block copolymer is a polyurethane-polyether, and if X is —NH—, the block copolymer is a polyurea-polyether. Within the block copolymer, the number of carbon atoms in the repeating units may vary and there may be varieties and combinations of numbers of carbon atoms therein. The number average molecular weight of the repeating formula ($I_h$) is preferably in the range of about 200 to 3000, and more preferably about 200–1000. In a preferred embodiment of the invention $R_i$ is linear —(CH$_2$)$_6$—, or a moiety of composition selected from the group primarily comprising formula (S), formula (T), formula (U), or (V) below, and a combination or mixtures thereof.

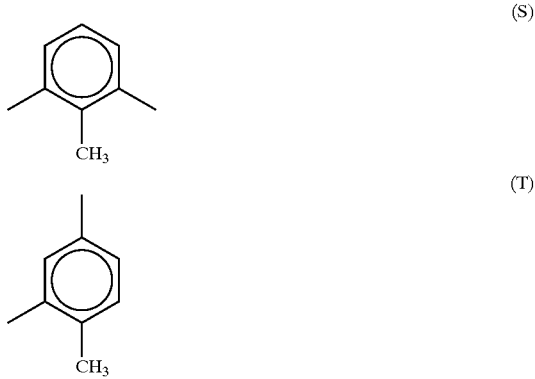

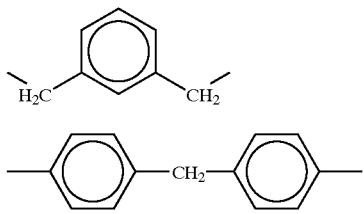

(V)

—⟨phenyl⟩—CH₂—⟨phenyl⟩—

These structures correspond 1,6-hexanediisocyanate, tolylene-2,6-diisocyanate, tolylene-2,4-diisocyanate, 1,3-xylylenediisocyanate, and 4,4'-methylenebis (phenylisocyanate), respectively. It has been discovered that the oxygen content and molecular weight of the polyether glycol affects permeation properties of the resulting block copolymers. Thus, the polyether segment, (PE), is derived preferably from a polyether glycol of number average molecular weight of about 600–8000, and more preferably about 1000–4000, and preferably an oxygen/carbon ratio of about 0.2–0.5. Preferred polyether glycols are hydroxyl terminated polyethylene glycol, hydroxyl terminated 1,2-polypropylene glycol, and hydroxyl terminated 1,4-polybutylene glycol, although other glycols known or used by one skilled in the art may be used. The hard segment of the block copolymer is derived from the reaction of residual aliphatic or aromatic diisocyanate end groups or monomer with either at least one aliphatic diol or at least one aliphatic diamine. Preferred diols or diamines contain at least about 2–18 carbon atoms and can be linear or branched. Most preferred are diols or diamines containing at least about 2–6 carbon atoms. Typical diols and diamines are ethylene glycol, 1,3-propanediol, 1,2-propanediol, 1,4-butanediol, 1,6-hexanediol, 1,2-diaminoethane, 1,4-diaminobutane, 1,5-diaminopentane, 1,5-diaminohexane, 1,6-diaminohexane, and dl-serine (3-amino-2-hydroxypropionic acid), although other diols and diamines known or used by one skilled in the art may be used. Typically, the polymers of this invention exhibit a number average molecular weight in the range from about 23,000 to 400,000 and preferably about 50,000–280,000. As shown from the variety of combinations of components, a wide range and variety of types of polyurethane-polyether and polyurea-polyether block copolymers are contemplated and disclosed herein.

It has also been discovered that the ratio of soft segment to hard segment of these block copolymers is critical to gas separation properties of the polymer and the ability to fabricate the polymers into suitable membranes. Preferably, the soft segment comprises about 50–90 weight % of the polymer weight, and most preferably, about 60–85%. These block copolymers exhibit superior permeability and permselectivity with respect to several gaseous mixtures and particularly with respect to separating polar gases from non-polar gases. They can be fabricated into various membrane structures, depending on the particular end use.

Gas separation membranes prepared from such block polymers possess an excellent balance of gas permeation rate and permselectivity for one gas over other gases in a multi-component gas mixture. It has been discovered that the membranes of this invention exhibit extremely high permeability for polar gases, and excellent permselectivity versus non-polar gases. Thus, these membranes are ideally suited for the separation of polar gases, such as carbon dioxide, hydrogen sulfide, and sulfur dioxide from non-polar gases, such as helium, hydrogen, nitrogen, oxygen, and methane. Since the separation of carbon dioxide from hydrogen is a difficult separation with high industrial significance, it was chosen to demonstrate the utility of the membranes of this invention. It was found that the polyurethane-ether and polyurea-ether membranes exhibit significantly higher carbon dioxide permeability than prior-art membranes while maintaining excellent carbon dioxide/hydrogen selectivity, thus clearly differentiating them from the prior art.

The high gas permeability of these membranes is believed to be due to the propensity of the polyether soft segment to absorb high amounts of the more permeable gas. The high selectivity of these membranes is believed to be due to the interactions between the semi-crystalline polyurethane or polyurea hard segments and the polyether soft segments. The preferred polyurethane-polyether and polyurea-polyether block copolymers are insoluble or only slightly soluble in most common solvents. Suitable solutions for membrane fabrication can be made using highly polar solvents such as N-methyl-2-pyrrolidone, N,N-dimethylacetamide, m-cresol and the like although other highly polar solvents known or used by one skilled in the art may be used. Alternatively, membranes in accordance with this invention can be melt-processed at elevated temperatures, generally above 200° C. The polymer can be formed into films or hollow fiber membranes by any of the diverse techniques known or used by one skilled in the art. A preferred form of the membrane is a composite structure comprising a non-selective microporous support layer coated with a thin layer of the block copolymer to provide the separation function. Typically, the support layer of such a composite membrane is made by solution-casting a film or spinning a hollow fiber. The selective layer is usually solution coated on the support in a separate step. Alternatively, hollow-fiber composite membranes can be made by co-extrusion of both the support material and the separating layer simultaneously as described in U.S. Pat. No. 5,085,676. The membranes of the invention may be housed in any convenient type of separation unit. For example, flat-sheet membranes can be stacked in plate-and-frame modules or wound in spiral-wound modules. Hollow-fiber membranes are typically potted with a thermoset resin in cylindrical housings. The final membrane separation unit can comprise one or more membrane modules. These can be housed individually in pressure vessels or multiple modules can be mounted together in a common housing of appropriate diameter and length. In operation, a mixture of gases is contacted with one side of the membrane. Under a suitable driving force for permeation, such as imposing a pressure difference between the feed and permeate sides of the membrane, one gas, usually called the "fast" gas, passes to the permeate side at higher rate than other gases in the mixture. This produces a "fast" gas-enriched or concentrated stream which is withdrawn from the permeate side of the membrane. The "fast" gas-depleted residue, occasionally referred to as the "retentate", is withdrawn from the feed side.

The membranes of this invention are particularly suited for separating polar gases from non-polar gases. That is, the polar gases permeate faster than the non-polar gases. For example, the membranes of this invention are well suited for separating carbon dioxide (polar gas) from hydrogen, or carbon dioxide from methane or nitrogen. Thus a gas mixture that contains carbon dioxide and hydrogen can be separated into a carbon dioxide-rich stream, and a carbon dioxide-depleted stream. The carbon dioxide-rich stream, often referred to as the "permeate", is collected at lower pressure on the permeate side of the membrane, and the carbon dioxide-depleted stream, occasionally referred to as the "retentate", is withdrawn from the feed side. The novel process can operate under a wide range of conditions and is thus adapted to accept a feed stream supplied from diverse sources. If the feed stream is a gas that exists already at a sufficiently high, above-atmospheric pressure and a pressure gradient is maintained across the membrane, the driving force for separation can be adequate without raising feed stream pressure farther. Otherwise, the feed stream can be compressed to a higher pressure and/or a vacuum can be drawn on the permeate side of the membrane to provide adequate driving force. Preferably the driving force for separation should be a pressure gradient across the membrane of about 0.7 to about 11.0 MPa (100–1600 psi).

The fundamental steps of the separation process include:

a) providing a two-sided, selective permeable membrane comprising a block copolymer having the repeating units of formulae $(I_s)$ and $(I_h)$, b) contacting a first side of the membrane with a feed gas mixture, c) causing the component gases of the feed mixture to selectively permeate through the membrane, thereby forming on the second side of the membrane a permeate composition which has a greater concentration of a more permeable species than that of the feed mixture, d) removing from the second side of the membrane a permeate composition enriched in the more permeable species, and e) withdrawing from the first side of the membrane a gas composition depleted in the more permeable species.

This invention is now illustrated by examples of certain representative embodiments thereof, wherein all parts, proportions and percentages are by weight unless otherwise indicated. All units of weight and measure not originally obtained in SI units have been converted to SI units.

EXAMPLES

General Procedure for Polymer Synthesis

A flame-dried 3-necked round bottomed flask, equipped with a mechanical stirrer, an addition funnel, and a nitrogen inlet, was charged with the hydroxyl terminated polyether glycol, T-12 catalyst (dibutyltindilaurate), and N-methyl-2-pyrrolidone ("NMP"). The diisocyanate, dissolved in NMP, was added drop-wise to the solution over a 5-minute period. The solution was gradually heated to around 90° C. for 2 hours under a nitrogen atmosphere. The solution was then cooled to room temperature and the diol (or diamine), dissolved in NMP, was added drop-wise over a 5-minute period. The polymer solution was then heated to around 80–90° C. for 2 hours.

After cooling the polymer solution to room temperature, the copolymer was precipitated by pouring the solution into acetone at room temperature, and ground up in a blender. The polymer was filtered and washed with acetone (2×). The polymer was air-dried overnight at room temperature and then further dried in a vacuum oven at 80° C. for 36 hours.

A film was solution cast from a solvent such as NMP or m-cresol, or melt-pressed. For the solution cast method, a 20% (by weight) polymer solution was cast onto a glass plate that has been preheated to around 80–100° C. The film is kept of the plate for 12–18 hours to ensure the removal of most of the solvent. After removing the film from the glass plate, the film is further dried in a vacuum oven at 80° C. under a nitrogen atmosphere for 3 days.

For the melt pressed film, the polymer is pressed at an elevated temperature (generally around 200° C.) in a melt-press at about 5000 psi using a 0.10 mm (4 mil) template. The material was maintained at the elevated temperature for 1–2 minutes, and then allowed to gradually cool in the press. The film is then removed from the template.

Procedure for Carbon Dioxide/Hydrogen Single-gas Permeation Measurements

A sample disk of 47 mm diameter was cut from a sheet of polymer film (generally 0.05 to 0.30 mm thick) and placed in a 47-mm ultrafiltration permeation cell (Millipore) modified for gas permeation measurement. Permeation measurements were conducted by placing the cell in an oven maintained at 35° C. Hydrogen, at a pressure of 1.5 MPa (200 psig), followed by carbon dioxide at (1.5 MPa) was introduced into the cell, in that order. The permeate pressure was maintained at 4–20 mmHg. The permeate flowrate was determined from the rate of increase in pressure over time in the fixed-volume permeate chamber of the permeation cell with a Baratron pressure sensor.

The permeation performance of the polymer was characterized in terms of carbon dioxide permeability and carbon dioxide/hydrogen permselectivity. The permeability is the permeate flowrate normalized by the film surface area and the film thickness and by the pressure difference across the film. Units of permeability are Barrers. One Barrer is $10^{-10}$ $cm^3$ (STP)·cm/(sec·cm2·cm Hg). The carbon dioxide/hydrogen permselectivity is the ratio of the carbon dioxide and hydrogen permeabilities.

Procedure for Carbon Dioxide/Hydrogen Mixed-Gas Permeation Measurements

A sample disk of 47 mm diameter was cut from a sheet of polymer film (generally 0.050 to 0.30 mm thick) and placed in a 47-mm ultrafiltration permeation cell (Millipore) modified for gas permeation measurement. The cell was equipped with ports for a feed stream and a retentate stream on the upstream side of the sample disk and for a permeate stream on the downstream side of the sample disk. Permeation measurements were conducted by placing the cell in an oven maintained at 35° C. A feed gas mixture of 20% carbon dioxide in hydrogen was provided as the feed stream at a pressure of 1.5 MPa (200 psig). The feed flowrate was set high enough to ensure less than 1% conversion of the feed into permeate. The permeate pressure was 4–20 mmHg.

The composition of the feed and permeate streams was measured by gas chromatography with a thermal conductivity detector and high-purity nitrogen as carrier gas. The permeate composition was in the range 20 to 80% carbon dioxide. The permeate flowrate was determined from the rate of increase in pressure over time in the fixed-volume permeate chamber of the permeation cell with a Baratron pressure sensor. The permeation performance of the polymer was characterized in terms of carbon dioxide permeability and carbon dioxide/hydrogen permselectivity. The carbon dioxide permeability is the flowrate of carbon dioxide across the film normalized by the film surface area and film thickness and by the carbon dioxide partial pressure difference across the film. Units of permeability are Barrers. One Barrer equals $10^{-10}$ $cm^3$ (STP)·cm/(sec·cm²·cm Hg). The carbon dioxide/hydrogen permselectivity is simply the ratio of the carbon dioxide and hydrogen permeabilities.

Comparative Example 1

A film PEBAX MH1657, a polyether-block co-polyamide polymer from Atofina Chemicals, Inc, 2000 Market Street, Philadelphia, Pa., 19103, was melt pressed at 250° C. at 5000 psig using a 3-mil template (~3.0 g of polymer). The sample was maintained at 250° C. for 1 minute at pressure, then allowed to cool to 10° C. A disk of the film was tested for gas permeation properties as described above.

| Single gas permeation results: | |
|---|---|
| Permeability in Barrers: | 147 |
| Carbon dioxide/hydrogen selectivity: | 7.5 |
| Mixed gas permeation results: | |
| Permeability in Barrers: | 101 |
| Carbon dioxide/hydrogen selectivity: | 5.1 |

Example 1

A flame-dried 3-necked 250 mL round bottomed flask, equipped with a mechanical stirrer, an addition funnel, and a nitrogen inlet, was charged with 15.0 g (0.0075 mol) of PPG-2000 (hydroxyl terminated poly-1,2-propylene glycol, MW~2000), 0.10 g of T-12 catalyst (dibutyltindilaurate), and 80 mL of NMP. The solution was stirred at room temperature and 3.785 g (0.0225 mol) of HDI [hexane-1,6-diisocyanate], dissolved in 20 mL of NMP, were added drop-wise to the solution over a 5-minute period. The solution was gradually heated to around 90° C. and kept at this temperature for 2 hours under a nitrogen atmosphere. The solution was then cooled to room temperature and 1.352 g (0.015 mol) of 1,4-butane diol, dissolved in 20 mL of NMP, were added drop-wise over a 5-minute period. The polymer solution was then reheated to 80–90° C. for 2 hours.

After cooling the polymer solution to room temperature, the polyurethane-ether was precipitated into water and ground up in a blender. The polymer was filtered and washed with water (3x). The polymer was air-dried overnight at room temperature and then further dried in a vacuum oven at 80° C. for 36 hours. The polymer had an inherent viscosity of 0.60 dL/g in NMP at 25° C.

A film was cast from a 20% (by weight) NMP solution onto a glass plate at around 100° C. for 12 hours. The film was then removed from the plate and allowed to air-dry at room temperature overnight. The film was then further dried in a vacuum oven at 80° C. for 72 hours.

Gas permeation results are reported in Table 1.

Example 2

A flame-dried 3-necked 250 mL round bottomed flask, equipped with a mechanical stirrer, an addition funnel, and a nitrogen inlet, was charged with 15.0 g (0.005 mol) of PPG-3000 (hydroxyl terminated poly-1,2-propylene glycol, MW~3000), 0.10 g of T-12 catalyst (dibutyltindilaurate), and 80 mL of NMP. The solution was stirred at room temperature and 2,523 g (0.015 mol) of HDI [hexane-1,6-diisocyanate], dissolved in 20 mL of NMP, was added drop wise to the solution over a 5-minute period. The solution was gradually heated to around 90° C. and kept at this temperature for 2 hours under a nitrogen atmosphere. The solution was then cooled to room temperature and 1.022 g (0.010 mol) of 1,5-diaminopentane, dissolved in 20 mL of NMP, was added drop wise over a 5-minute period. The polymer solution was then reheated to around 80–90° C. for 2 hours.

After cooling the polymer solution to room temperature, the polyurea-ether was precipitated into water and ground up in a blender. The polymer was filtered and washed with water (3x). The polymer was air-dried overnight at room temperature and then further dried in a vacuum oven at 80° C. for 36 hours. The polymer had an inherent viscosity of 0.77 dL/g in NMP at 25° C.

A film was cast from a 20% (by weight) m-cresol solution onto a glass plate at around 100° C. for 12 hours. The film was then removed from the plate and allowed to air-dry at room temperature overnight. The film was then further dried in a vacuum oven at 80° C. for 72 hours.

Gas permeation results are reported in Table 1.

Examples 3–14

Various polymers were made using the ingredients depicted in Table 1 utilizing the synthesis techniques of Example 1 and Example 2. Dense films were either cast from solution or melt pressed to form films for permeation testing. Gas permeation results are shown in Table 1.

It should be noted that the gas permeabilities could also be tested at other suitable temperatures and/or pressures. Typically, the membranes are used to separate gases which are at about 0° C. to about 120° C. Additionally, the membranes of this invention may vary in thickness and can be of about 0.00005 mm about 0.30 mm or of other thickness known or used by one skilled in the art.

TABLE 1

| Example # | Diol or Diamine | Polyether | Diiso-cyanate | Wt % SS | $P_{(CO2)}$ (Ba) | $P_{(H2)}$ (Ba) | $P_{(CO2)}/P_{(H2)}$ | Temp (° C.) |
|---|---|---|---|---|---|---|---|---|
| 1 | A | PPG-2000 | Z | 75 | 527 | 80 | 6.6 | 25 |
| 2 | C | PPG-3000 | Z | 81 | 586 | 76.6 | 7.7 | 22 |
| 3 | A | Ter-2000 | Z | 70 | 271 | 44 | 6.2 | 25 |
| 4 | A | Ter-2900 | Z | 71 | 319 | 48 | 6.6 | 25 |
| 5 | B | PEG-1500 | Z | 78 | 167 | 22.5 | 7.4 | 35 |
| 6 | B | Ter-2000 | Z | 70 | 422 | 65 | 6.5 | 25 |
| 7 | B | PPG-3000 | Z | 72 | 501 | 85.5 | 5.9 | 25 |
| 8 | B | PPG-2000 | U | 73 | 429 | 78.7 | 5.4 | 25 |
| 9 | B | PPG-2000 | V | 72 | 317 | 55 | 5.8 | 25 |
| 10* | C | PEG-1500 | Z | 72 | 110 | 14.3 | 7.7 | 35 |
| 11 | D | PPG-2000 | Z | 69 | 503 | 69.2 | 7.3 | 25 |

TABLE 1-continued

| Example # | Diol or Diamine | Polyether | Diisocyanate | Wt % SS | $P_{(CO2)}$ (Ba) | $P_{(H2)}$ (Ba) | $P_{(CO2)}/P_{(H2)}$ | Temp (° C.) |
|---|---|---|---|---|---|---|---|---|
| 12 | E | PEG-3400 | Z | 74 | 15 | 2 | 7.3 | 33 |
| 13* | F | PEG-1500 | Z | 74 | 103 | 14.9 | 6.9 | 35 |
| 14 | B | PPG-2000 | T | 69 | 473 | 99 | 4.78 | 25 |

Note:
All gas testing results are by the single gas test method unless the example number is designated with an *, in which case the mixed gas test was used
Glossary:
A = 1,4-butanediol
B = 1,4-diaminobutane
C = 1,5-diaminopentane
D = dl-serine
E = 1,2-ethylenediamine
F = 1,3-propanediol
Z = 1,6-hexanediisocyanate, HDI
U = 1,3-bis(isocyanatobenzene) (xylenediisocyanate), xylylene diisocyanate
V = 4,4'-methylenebis(phenylisocyanate), MDI
T = tolylene 2,4-diisocyanate, TDI
PEG-x = hydroxyl terminated polyethylene glycol, (MW = x)
PPG-x = hydroxyl terminated 1,2-polypropylene glycol, (MW = x)
Ter-x = Terathane (hydroxyl terminated polybutylene glycol, (MW = x)

It is clear from the above examples that the polyurethane-ether and polyurea-ether membranes of this invention exhibit significantly higher carbon dioxide permeability than prior-art polymers while maintaining excellent carbon dioxide/hydrogen selectivity, thus clearly differentiating them from the prior art.

Although specific forms of the invention have been selected for illustration in the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for separating component gases of a gas mixture comprising the steps of:

a) providing a permeable membrane comprising a polyurethane-polyether or polyurea-polyether block copolymer comprising repeating units of a polymer soft segment of formula ($I_s$) and a polymer hard segment of formula ($I_h$):

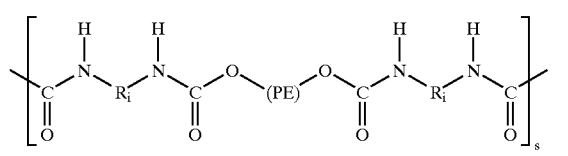
($I_s$)

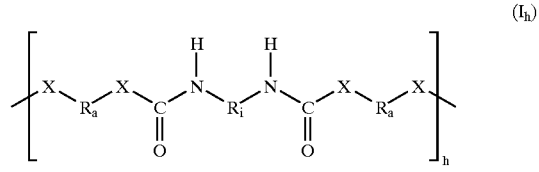
($I_h$)

wherein $R_i$ of formulae ($I_s$) and ($I_h$) is an aliphatic or aromatic radical;

s denotes soft;

h denotes hard;

(PE) of formula ($I_s$) is a polyether segment;

$R_a$ of formula ($I_h$) is a linear or branched aliphatic radical; and

X of formula ($I_h$) is an oxygen atom or —NH—;

b) contacting a first side of the membrane with a feed gas mixture; and c) causing a component of said feed gas mixture to selectively permeate through said permeable membrane, thereby forming on a second side of the membrane a permeate composition which has a greater concentration of said component than that of said feed gas mixture.

2. The process of claim 1, further comprising the step of removing from said second side of the membrane said permeate composition.

3. The process of claim 2, further comprising the step of withdrawing from said first side of the membrane a gas composition depleted in said component.

4. The process of claim 1, wherein $R_i$ is an aliphatic or aromatic radical comprising about 2–18 carbon atoms.

5. The process of claim 4, wherein $R_i$ is linear —($CH_2$)6—, or is selected from the group of molecular structures consisting of the formulas:

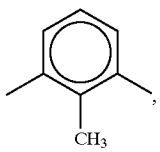
(S)

-continued

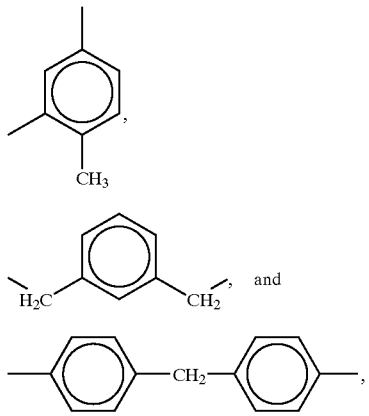

and mixtures thereof.

6. The process of claim 1, wherein said polyether segment has a number average molecular weight, $M_n$, ranging from at least about 600 to 8000.

7. The process of claim 1, wherein $R_a$ is an linear or branched aliphatic radical of at least about 2–18 carbon atoms, and wherein X is an oxygen atom.

8. The process of claim 1, wherein $R_a$ is a linear or branched aliphatic radical comprising at least about 2–18 carbon atoms, and wherein X is —NH—.

9. The process of claim 1, wherein the number average molecular weight of said polymer hard segment $(I_h)$ is in the range of about 200 to 3000.

10. The process of claim 1, wherein said polyurethane-polyether or polyurea-polyether block copolymer exhibits a number average molecular weight in the range from about 23,000 to 400,000.

11. The process of claim 1, wherein an oxygen to carbon ratio of said polyether segment is about 0.2–0.5.

12. The process of claim 11, wherein said polyether segment is derived from a polyether glycol selected from a group consisting of hydroxyl terminated polyethylene glycol, hydroxyl terminated 1,2-polypropylene glycol, hydroxyl terminated 1,4-polybutylene glycol, and mixtures thereof.

13. The process of claim 1, wherein $R_a$ is derived from a linear or branched aliphatic diol comprising at least about 2–18 carbon atoms.

14. The process of claim 13, wherein said branched aliphatic diol is selected from the group consisting of ethylene glycol, 1,3-propanediol, 1,2-propanediol, 1,4-butanediol, 1,6-hexanediol, and mixtures thereof.

15. The process of claim 1, wherein $R_a$ is derived from a linear or branched aliphatic diamine comprising at least about 2–18 carbon atoms.

16. The process of claim 15, wherein said linear or branched aliphatic diamine is selected from the group consisting of 1,2-diaminoethane, 1,4-diaminobutane, 1,5-diaminopentane, 1,5-diaminohexane, 1,6-diaminohexane, and mixtures thereof.

17. The process of claim 15, wherein said membrane comprises flat-sheet membranes stacked in plate-and-frame modules or wound in spiral-wound modules.

18. The process of claim 1, wherein said linear or branched aliphatic radical is derived from a mixture comprising an aliphatic diol and an aliphatic diamine.

19. The process of claim 1, wherein $R_a$ is derived from dl-seine (3-amino-2-hydroxypropionic acid).

20. The process of claim 1, wherein said polymer soft segment $(I_s)$ comprises about 50–90 weight % of said polyurethane-polyether or polyurea-polyether block copolymer.

21. The process of claim 1, wherein said component comprises a polar gas.

22. The process of claim 21, wherein said polar gas is selected from the group consisting of carbon dioxide, hydrogen sulfide, sulfur dioxide, water, and mixtures thereof.

23. The process of claim 21, wherein the solubility of said component in said polyester-polyether block copolymer is controlled by the relative affinity of a molecule of said component to said polyurethane-polyether or polyurea-polyether block copolymer.

24. The process of claim 21, wherein said polar gas is separated at temperatures of about 0° C. to about 120° C.

25. The process of claim 21, wherein a pressure gradient across said permeable membrane is about 0.7 to about 11 Mpa during gas separation.

26. The process of claim 1, wherein said membrane has a thickness of about 0.00005 mm to about 0.30 mm.

27. The process of claim 26, wherein said permeable membrane further comprises a non-selective microporous support.

28. The process of claim 26, further comprising a membrane module.

29. The process of claim 28, wherein said module is housed individually in a separate pressure vessel or wherein multiple said membrane modules are mounted together in a common housing.

30. A permeable membrane for separating and/or concentrating gases comprising:

a permeable membrane comprising a polyurethane-polyether or polyurea-polyether block copolymer, wherein said polyurethane-polyether or polyurea-polyether block copolymer comprises repeating units of a polymer soft segment of formula $(I_s)$ and a polymer hard segment of formula $(I_h)$:

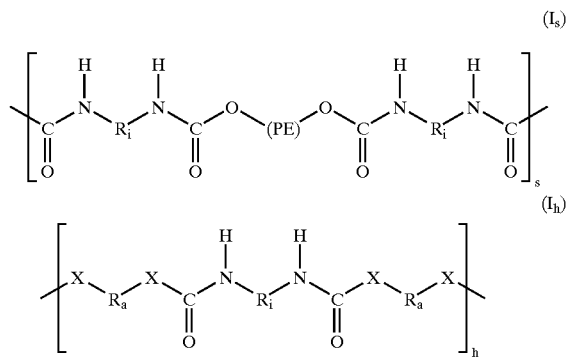

wherein $R_i$ of formula $(I_s)$ and $(I_h)$ is an aliphatic or aromatic radical;

s denotes soft;

h denotes hard;

(PE) is a polyether segment;

$R_a$ of formula $(I_h)$ is a linear or branched aliphatic radical; and

X of formula $(I_h)$ is an oxygen atom or —NH—.

31. The membrane of claim 30, wherein $R_i$ is an aliphatic or aromatic radical comprising at least about 2–18 carbon atoms.

32. The membrane of claim 31, wherein $R_i$ is linear —$(CH_2)6$—, or selected from the group of molecular structures consisting of the formulas:

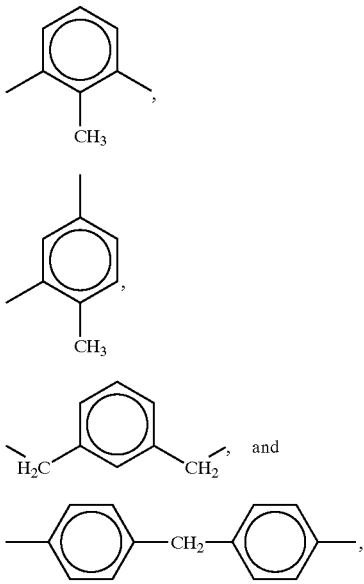

and mixtures therof.

33. The membrane of claim 30, wherein said polyether segment has a number average molecular weight, $M_n$, ranging from about 600 to 8000.

34. The membrane of claim 30, wherein $R_a$ is a linear or branched aliphatic radical comprising at least about 2–18 carbon atoms, and wherein X is an oxygen atom.

35. The membrane of claim 30, wherein $R_a$ is a linear or branched aliphatic radical comprising at least about 2–18 carbon atoms, and wherein X is —NH—.

36. The membrane of claim 30, wherein the number average molecular weight of said polymer hard segment ($I_h$) is in the range of about 200 to 3000.

37. The membrane of claim 30, wherein said polyurethane-polyether or polyurea-polyether block copolymers exhibit a number average molecular weight in the range from about 23,000 to 400,000.

38. The membrane of claim 30, wherein an oxygen to carbon ratio of said polyether segment is about 0.2–0.5.

39. The membrane of claim 30, wherein said polyether segment is derived from a polyether glycol selected from the group consisting of hydroxyl terminated polyethylene glycol, hydroxyl terminated 1,2-polypropylene glycol, hydroxyl terminated 1,4-polybutylene glycol, and mixtures thereof.

40. The membrane of claim 30, wherein $R_a$ is derived from a linear or branched aliphatic diol containing about 2–18 carbon atoms.

41. The membrane of claim 40, wherein said linear or branched aliphatic diol is selected from the group consisting of ethylene glycol, 1,3-propanediol, 1,2-propanediol, 1,4-butanediol, 1,6-hexanediol, and mixtures thereof.

42. The membrane of claim 30, wherein $R_a$ derived from a linear or branched aliphatic diamine comprising at least about 2–18 carbon atoms.

43. The membrane of claim 42, wherein said linear or branched aliphatic diamine is selected from the group consisting of 1,2-diaminoethane, 1,4-diaminobutane, 1,5-diaminopentane, 1,5-diaminohexane, 1,6-diaminohexane, and mixtures thereof.

44. The membrane of claim 30, wherein $R_a$ is derived from a mixture of an aliphatic diol and an aliphatic diamine.

45. The membrane of claim 30, wherein $R_a$ is derived from dl-serine (3-amino-2-hydroxypropionic acid).

46. The membrane of claim 30, wherein said polymer soft segment ($I_s$) comprises about 50–90 weight % of said polyurethane-polyether or polyurea-polyether block copolymer.

47. The membrane of claim 30, having a thickness of about 0.00005 mm to about 0.30 mm.

48. The membrane of claim 47, further comprising a non-selective microporous support.

49. The membrane of claim 30, wherein $R_i$ comprises an aliphatic or aromatic radical comprising at least about 2–18 carbon atoms and wherein $R_a$ comprises a linear or branched aliphatic radical comprising at least about 2–18 carbon atoms.

50. The membrane of claim 30, wherein said polyether segment is derived from a polyether glycol selected from the group consisting of hydroxyl terminated polyethylene glycol, hydroxyl terminated 1,2-polypropylene glycol, hydroxyl terminated 1,4-polybutylene glycol, and mixtures thereof, and wherein said polyether segment has a number average molecular weight, $M_n$, ranging from about 600 to 8000.

51. The membrane of claim 30, wherein the number average molecular weight of said polymer hard segment ($I_h$) is in the range of about 200 to 3000 and wherein said polymer soft segment ($I_s$) comprises about 50–90 weight % of said polyurethane-polyether or polyurea-polyether block copolymer.

52. The membrane of claim 30, wherein $R_a$ is derived from a mixture consisting of an aliphatic diol and an aliphatic diamine and wherein $R_a$ is derived from dl-serine (3-amino-2-hydroxypropionic acid).

* * * * *

UNITED STATES PATENT AND TRADEMARK OFFICE
CERTIFICATE OF CORRECTION

PATENT NO. : 6,843,829 B2
DATED : January 18, 2005
INVENTOR(S) : John W. Simmons It is certified that error appears in the above-identified patent and that said Letters Patent is hereby corrected as shown below:

<u>Column 13,</u>
Line 63, please replace the word "dl-seine" with the word -- dl-serine --.

Signed and Sealed this

Third Day of May, 2005

JON W. DUDAS
*Director of the United States Patent and Trademark Office*